(12) United States Patent
Chiang

(10) Patent No.: US 12,332,704 B2
(45) Date of Patent: Jun. 17, 2025

(54) CONNECTING STRUCTURE

(71) Applicant: PEGATRON CORPORATION, Taipei (TW)

(72) Inventor: Chih-Liang Chiang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 336 days.

(21) Appl. No.: 18/184,846

(22) Filed: Mar. 16, 2023

(65) Prior Publication Data
US 2023/0333607 A1    Oct. 19, 2023

(30) Foreign Application Priority Data

Apr. 15, 2022    (TW) .................................. 111114552

(51) Int. Cl.
*G06F 1/16*    (2006.01)
*E05D 11/00*    (2006.01)

(52) U.S. Cl.
CPC ........ *G06F 1/1683* (2013.01); *E05D 11/0081* (2013.01); *G06F 1/1681* (2013.01)

(58) Field of Classification Search
CPC ... G06F 1/1683; G06F 1/1681; E05D 11/0081
See application file for complete search history.

(56) References Cited

U.S. PATENT DOCUMENTS

| | | | |
|---|---|---|---|
| 9,535,465 B2 * | 1/2017 | Bohn ..................... | H04M 1/022 |
| 9,658,654 B1 * | 5/2017 | Wu ....................... | G06F 1/1683 |
| 9,891,672 B2 * | 2/2018 | Hampton ............... | G06F 1/1616 |
| 10,760,311 B2 * | 9/2020 | Regimbal ................. | E05D 7/04 |
| 11,339,594 B2 * | 5/2022 | Regimbal .............. | G06F 1/1681 |
| 11,874,708 B2 * | 1/2024 | Lin ........................ | G06F 1/1683 |
| 2003/0211873 A1 * | 11/2003 | Komiyama ............ | H01R 35/02 |
| | | | 455/575.3 |
| 2021/0141423 A1 * | 5/2021 | Park ...................... | F16C 41/008 |
| 2021/0200278 A1 * | 7/2021 | Lin ........................ | G06F 1/1616 |

FOREIGN PATENT DOCUMENTS

| | | | | |
|---|---|---|---|---|
| CN | 202545553 U | 11/2012 | | |
| CN | 112727908 A | * 4/2021 | .............. | F16C 11/04 |
| CN | 113031700 A | 6/2021 | | |
| KR | 20220145603 A | * 10/2022 | | |

* cited by examiner

*Primary Examiner* — Nidhi Thaker
(74) *Attorney, Agent, or Firm* — McClure, Qualey & Rodack, LLP

(57) ABSTRACT

A connecting structure includes a case, a rotating shaft, and a cable organizer. The case includes a hollow shell and an assembly plate. The assembly plate is accommodated in the hollow shell, and two through holes are formed between two opposite side edges of the assembly plate and an inner wall of the hollow shell. The rotating shaft is assembled to one side of the assembly plate. The cable organizer includes a tubular body, a spacer, and two inserts. The spacer is located at one end of the tubular body, and the two inserts are located at two opposite sides of another end of the tubular body. When the cable organizer is assembled to the case from the other side of the assembly plate, the two inserts respectively penetrate through the two through holes and are engaged with and fixed to the inner wall of the hollow shell.

10 Claims, 5 Drawing Sheets

CONNECTING STRUCTURE

CROSS-REFERENCE TO RELATED APPLICATION

This application claims the priority benefit of Taiwan application serial no. 111114552, filed on Apr. 15, 2022. The entirety of the above-mentioned patent application is hereby incorporated by reference herein and made a part of this specification.

TECHNICAL FIELD

The present disclosure relates to a connecting structure, and in particular, to a connecting structure including a cable organizer.

BACKGROUND

Currently, a cable organizer assembled to a connecting structure of a rotating shaft is available on the market. However, the cable organizer is frequently pulled when used, and therefore easily falls off after use for a long time. In order to resolve the problem that the cable organizer is easily disengaged and falls off, the cable organizer needs to be fixed through other structures, such as glue or screws.

However, gluing the cable organizer means adding a procedure to the assembly process, which easily causes glue overflow and affect the overall appearance. Fixing through the screws means adding a procedure and parts to the assembly process, and the locking screws in small connecting structures are small and cannot easily realize locking.

SUMMARY

In view of the above, an embodiment of the present disclosure provides a connecting structure, which includes a case, a rotating shaft, and a cable organizer. The case includes a hollow shell and an assembly plate. The assembly plate is accommodated in the hollow shell, and two through holes are formed between two opposite side edges of the assembly plate and an inner wall of the hollow shell. The rotating shaft is assembled to one side of the assembly plate. The cable organizer includes a tubular body, a spacer, and two inserts. The spacer is located at one end of the tubular body, and the two inserts are located at two opposite sides of another end of the tubular body. When the cable organizer is assembled to the case from the another side of the assembly plate, the two inserts respectively penetrate through the two through holes and are engaged with and fixed to the inner wall of the hollow shell.

In the present disclosure, after the cable organizer is arranged at the case, when the inserts penetrate through the through holes and are engaged with and fixed to the hollow shell, the inserts are prevented from moving toward an axis of the hollow shell by the through holes. Therefore, the inserts are prevented from being released from the engaged and fixed state, so that the cable organizer is uneasily disengaged from the case, which enhances the engagement between the cable organizer and the case. During assembly, the assembly may be completed merely by inserting the cable organizer through one end of the case, which can not only simplify the assembly process, but also enhance the engagement between the cable organizer and the case, thereby reducing the problem of disengagement after use for a long time.

DETAILED DESCRIPTION

Figure 1:
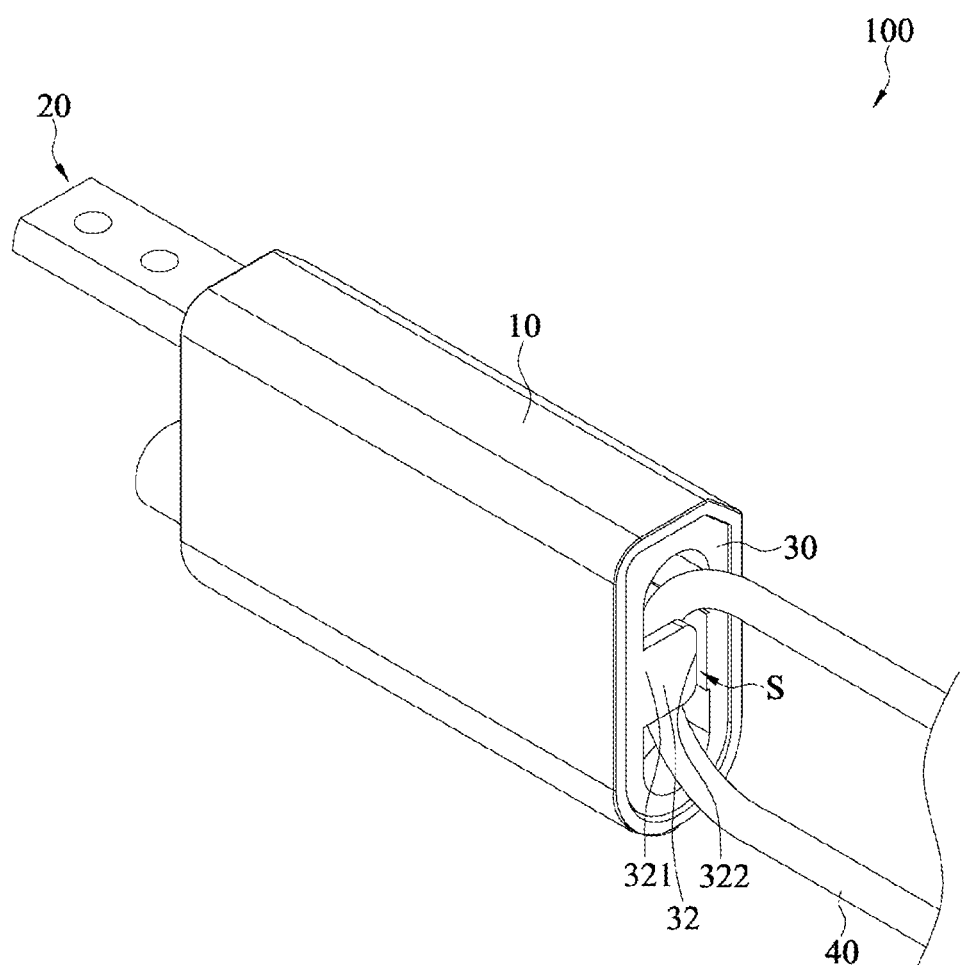
FIG. 1 is a schematic diagram of a connecting structure according to a first embodiment of the present disclosure.

Various embodiments are described in detail below. However, the embodiments are only described as examples and are not intended to limit the protection scope of the present invention. In addition, some elements may be omitted in the drawings in the embodiments, to clearly show technical features of the present disclosure. The same reference numeral is used to indicate the same or similar elements in all of the drawings.

Figure 2:
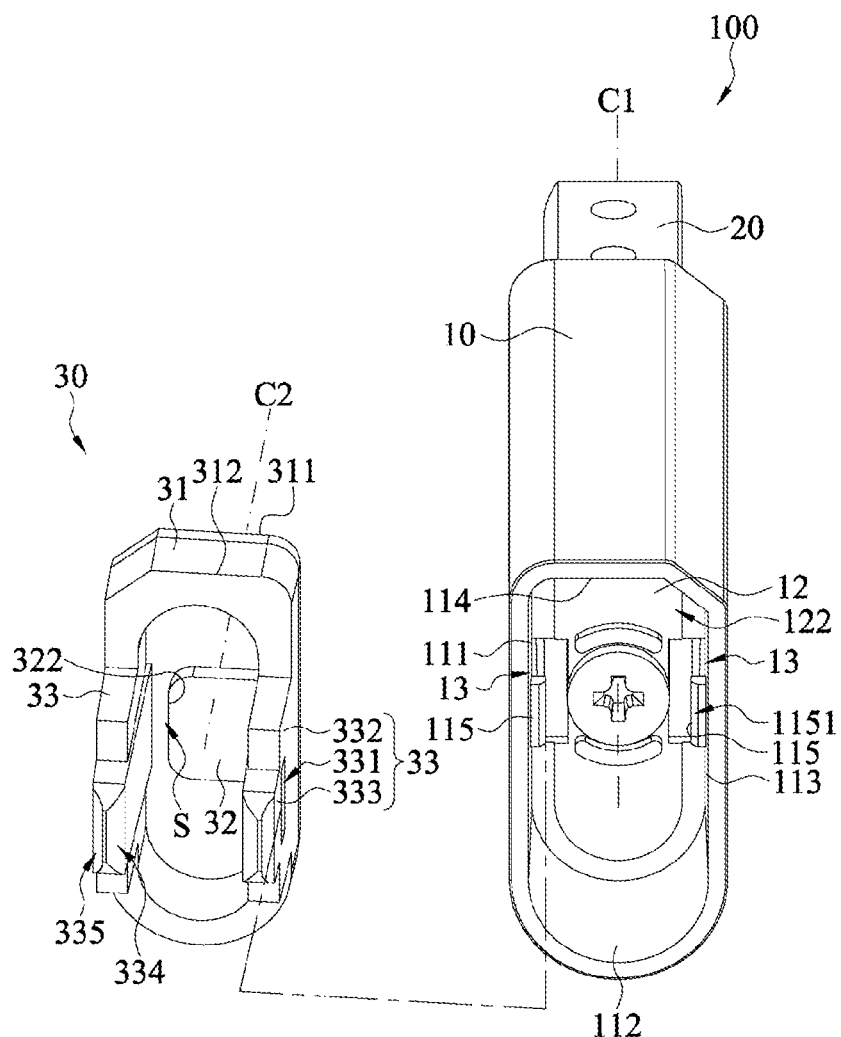
FIG. 2 is a schematic exploded view of a connecting structure according to a first embodiment of the present disclosure.
Figure 3:
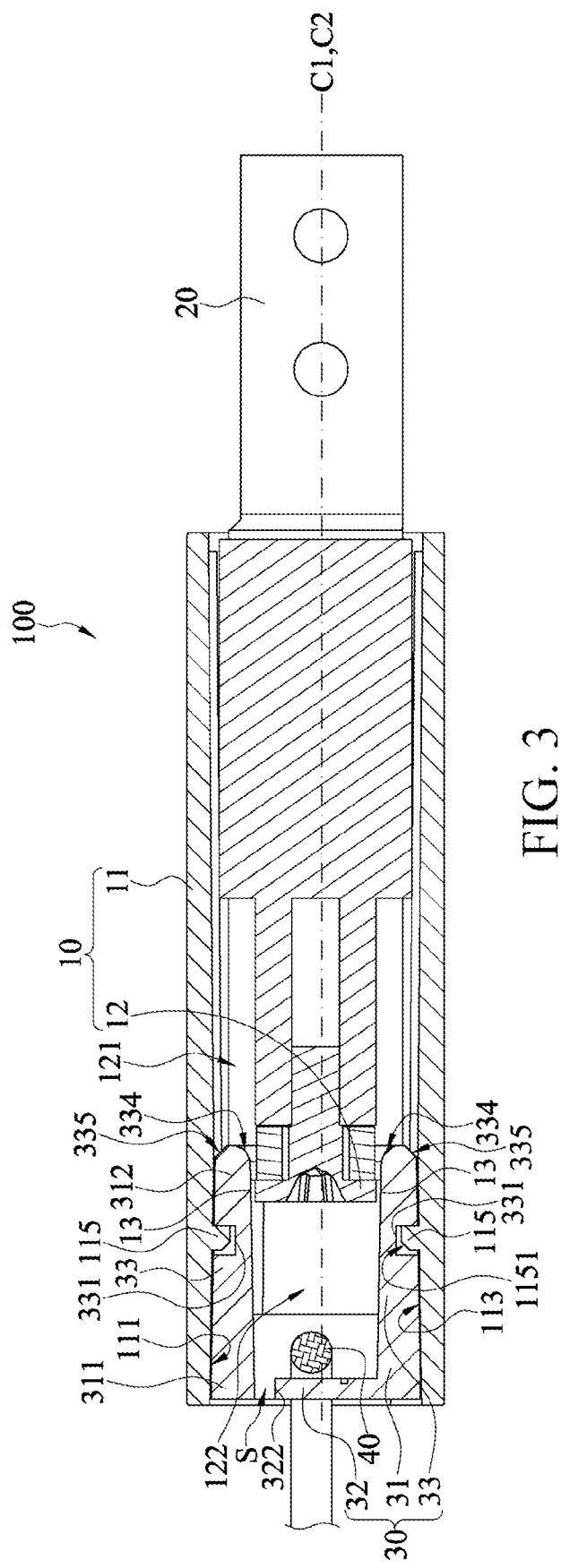
FIG. 3 is a cross-sectional view of the connecting structure according to the first embodiment of the present disclosure.

FIG. 1 is a schematic diagram of a connecting structure according to a first embodiment of the present disclosure. FIG. 2 is a schematic exploded view of a connecting structure according to a first embodiment of the present disclosure. FIG. 3 is a cross-sectional view of a connecting structure according to a first embodiment of the present disclosure. It can be learned from FIG. 1 and FIG. 2 that a connecting structure 100 in this embodiment includes a case 10, a rotating shaft 20 and a cable organizer 30. The connecting structure 100 may be, for example, a rotating shaft configured to be assembled to a position on an electronic device (not shown) requiring the rotating shaft, and may be configured allow passage of a cable 40 therethrough, to organize the cable.

The case 10 includes a hollow shell 11 and an assembly plate 12. It can be learned from FIG. 2 and FIG. 3 that the assembly plate 12 is accommodated in the hollow shell 11 along a radial direction of the hollow shell 11, and two through holes 13 are formed between two opposite side edges of the assembly plate 12 and an inner wall of the hollow shell 11. It can be learned from FIG. 2 and FIG. 3 that the hollow shell 11 is a hollow tube extending along a long axis C1 and includes a first inner wall 111, a second inner wall 112, a third inner wall 113, and a fourth inner wall 114 connected in sequence. The assembly plate 12 has a same shape as a space formed by the first inner wall 111, the second inner wall 112, the third inner wall 113, and the fourth inner wall 114 of the hollow shell 11. The assembly plate 12 is assembled to the hollow shell 11 along a radial direction perpendicular to the long axis C1 of the hollow shell 11, to partition the internal space of the hollow shell 11 into two sides 121 and 122.

It can be learned from FIG. 2 and FIG. 3 that the two through holes 13 are located between the inner wall of the hollow shell 11 and the assembly plate 12. One of the through holes 13 is located at a side of the first inner wall 111, and the other of the through holes 13 is located at a side of the third inner wall 113. In this way, the two through holes 13 are respectively located at the two opposite sides of the assembly plate 12.

The rotating shaft 20 is assembled to one side 121 of the assembly plate 12, and the cable organizer 30 is assembled to the case 10 from the other side 122 of the assembly plate 12. The cable organizer 30 includes a tubular body 31, a spacer 32, and two inserts 33. The spacer 32 is located at one end 311 of the tubular body 31, and the two inserts 33 are located at two opposite sides of another end 312 of the tubular body 31. When the cable organizer is assembled to the case 10 from the other side 122 of the assembly plate 12, the two inserts 33 are respectively penetrate through the two through holes 13, and each of the inserts 33 is engaged with and fixed to the inner wall of the hollow shell 11.

In the embodiment of FIG. 2 and FIG. 3, each of the inserts 33 includes a recessed portion 331, and the hollow shell 11 includes a protruding portion 115 on the inner wall at a position corresponding to the recessed portion 331 of the each insert 33, for example. It can be learned from FIG. 2 that a protruding portion 115 is provided on each of the first inner wall 111 and the third inner wall 113 of the hollow shell 11 in front of the through holes 13. An outer wall surface of each insert 33 includes the recessed portion 331. When the two inserts 33 correspondingly penetrate through the two through holes 13, as shown in FIG. 3, the recessed portions 331 are engaged with and fixed to the protruding portions 115, so that the cable organizer 30 is engaged with and fixed to the case 10. In addition, since the inserts 33 penetrate through the through holes 13 after being inserted, the assembly plate 12 and the inner wall of the hollow shell 11 can provide fixing for the inserts 33.

Specifically, if the recessed portion 331 is required to be disengaged from the protruding portion 115 when the insert 33 is pulled during use, the insert 33 needs to be moved toward the long axis C1 of the hollow shell 11. However, an end of the insert 33 penetrates through the through hole 13 is limited by the assembly plate 12 and the inner wall of the hollow shell 11 and cannot be move toward the long axis C1. Therefore, the recessed portion 331 cannot be disengaged from the protruding portion 115. Therefore, the inserts 33 can be prevented from being released from the engaged and fixed state, so that the cable organizer 30 is uneasily disengaged from the case 10, which enhances the engagement between the cable organizer and the case. In addition, during assembly, the assembly may be completed merely by inserting the cable organizer 30 through one end of the case 10, which can not only simplify the assembly process, but also enhance the engagement between the cable organizer and the case, thereby reducing the problem of disengagement after use for a long time.

Further, it can be learned from FIG. 2 and FIG. 3 that in this embodiment, each of the two inserts 33 includes an embedding portion 332 and a fixing portion 333. The embedding portion 332 is connected between the tubular body 31 and the fixing portion 333, the embedding portion 332 abuts against the assembly plate 12, and the fixing portion 333 penetrates through one of the through holes 13. A length of the fixing portion 333 in an up-down direction shown in FIG. 2 is less than that of the embedding portion 332 and is approximately equal to or less than a length of the through hole 13 in the up-down direction. The length of the embedding portion 332 in the up-down direction is greater than that of the through hole 13. In this way, when the cable organizer 30 is pushed against and assembled to the case 10, the pushing of the embedding portion 332 provides a feeling of completed assembly and positioning for the cable organizer 30. In this embodiment, each of the two inserts 33 includes the embedding portion 332 and the fixing portion 333. However, in other embodiments, the embedding portion 332 and the fixing portion 333 may be arranged on the insert 33 on either side. A fixing portion 333 that may extend through a height of the through hole 13 may be arranged on the other side and directly connected to the tubular body 31.

Next, the two inserts 33 each have a guide surface 334 at an end away from the tubular body 31 and facing the assembly plate 12. When the cable organizer 30 is assembled to the case 10, the insert 33 can provide relative movement away from the long axis C1 direction by the guide surface 334 and the assembly plate 12 after being moved toward the long axis C1 by the pushing of the protruding portion 115, so that the fixing portion 333 more easily enters the through hole 13.

In addition, as shown in FIG. 3, in this embodiment, each protruding portion 115 includes a first inclined surface 1151 on a side facing away from the assembly plate 12. Each of the inserts includes a second inclined surface 335 on an end away from an end of the tubular body 31 and facing the inner wall of the hollow shell 11. When the cable organizer is assembled to the case 10, the second inclined surface 335 of the insert 33 and the first inclined surface 1151 of the protruding portion 115 push against each other, so that the insert 33 can be moved more smoothly along the long axis C1.

As shown in FIG. 1 and FIG. 2, a side 321 of the spacer 32 is connected to the tubular body 31, and a spacing S exists between another side 322 and the tubular body 31. The spacer 32 may be made of an elastic material. In this way, when the cable 40 is to be placed into or removed from the cable organizer 30, the cable can be more easily assembled or removed through elastic movement and restoration of the spacer 32.

Further, in this embodiment, the tubular body 31 has a profile that is asymmetrically arranged when rotated around an axis C2 of the tubular body 31 by 180 degrees, which means that the profile of the tubular body 31 is asymmetrical. As shown in FIG. 2, the tubular body 31 bounded by a horizontal plane formed through the axis C2, with a lower portion being elliptical-like, and an upper portion being rectangular-like and includes an inclined surface at a corner on a side. That is to say, the shapes of the upper and lower portions of the tubular body 31 are asymmetric after rotation about the axis C2 by 180 degrees. In this way, it can provide the function of anti-dullness during assembly. In addition, the irregular outer shape can also provide a certain degree of spin stopping effect, and reduce the possibility of disengagement of the cable 40 caused by pulling.

Figure 4:
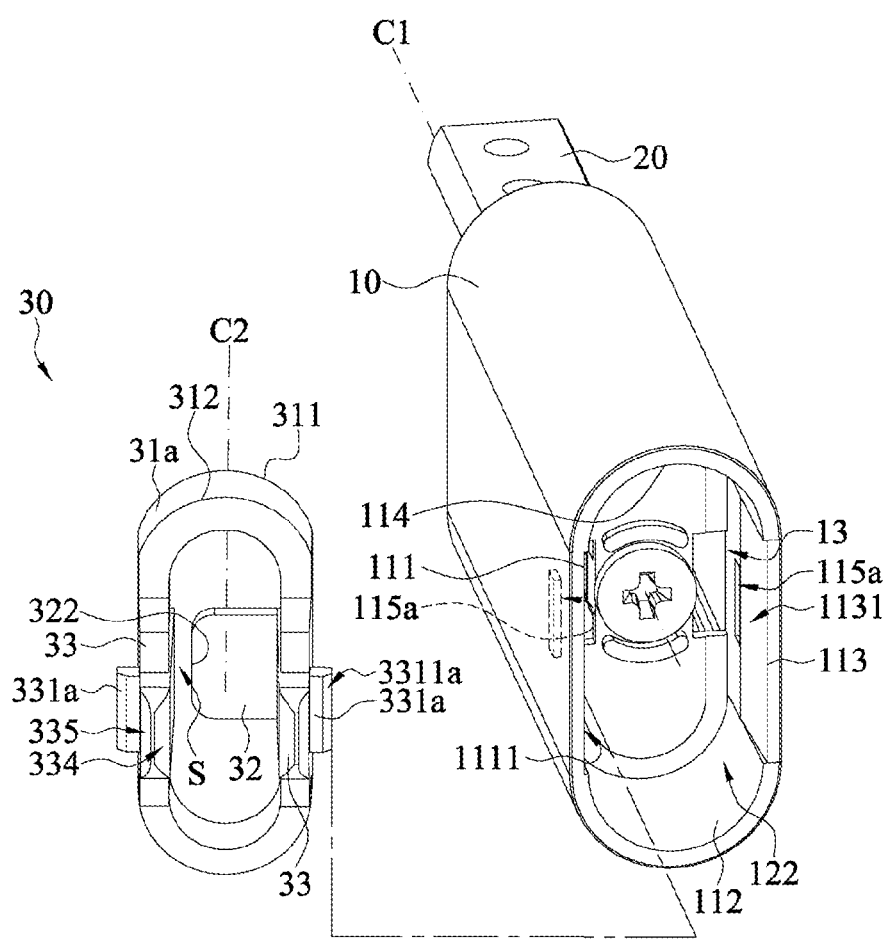
FIG. 4 is a schematic exploded view of a connecting structure according to a second embodiment of the present disclosure.
Figure 5:
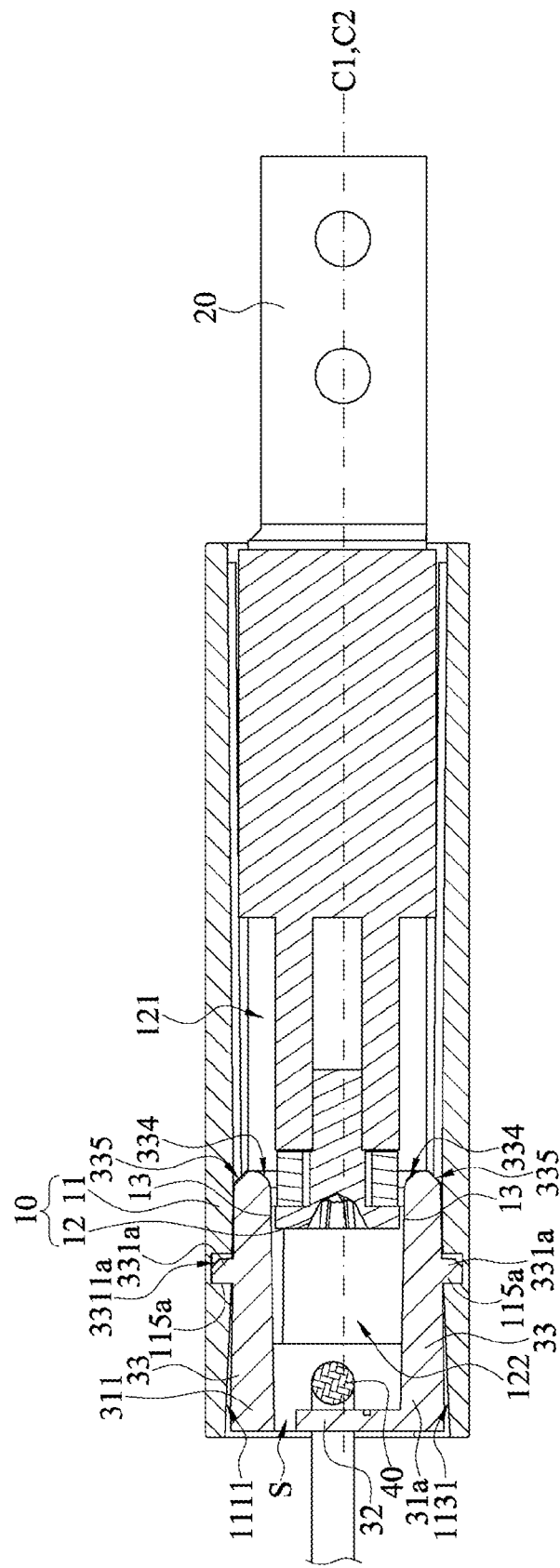
FIG. 5 is a cross-sectional view of the connecting structure according to the second embodiment of the present disclosure.

Next, referring to FIG. 4 and FIG. 5, FIG. 4 is a schematic exploded view of a connecting structure according to a second embodiment of the present disclosure, and FIG. is a cross-sectional view of the connecting structure according to the second embodiment of the present disclosure. The parts in this embodiment the same as those in the first embodiment are indicated by the same element symbols, and the same connections are not repeated. In this embodiment, the two inserts 33 are not provided with the recessed portion 331 but each are provided with the protruding portion 331a, and the inner wall of the hollow shell 11 is not provided with the protruding portion 115 but provided with the recessed portion 115a at the position corresponding to the protruding portion 331a of each insert 33. A first inclined plane 3311a is provided on a side of the protruding portion 331a facing away from the tubular body 31. When the cable organizer 30 is assembled to the case 10, the first inclined plane 3311a on a front end of the protruding portion 331a and the inner wall of the hollow shell 11 push against each other, so that the insert 33 is moved toward the long axis C1. When the protruding portion 331a is located at the recessed portion 115a, the insert 33 returns to an initial position under an elastic force, so that the protruding portion 331a is engaged with and fixed to the recessed portion 115a, thereby completing the assembly of the cable organizer 30.

Further, two second inclined planes 1111 and 1131 are provided on an inner side wall of the hollow shell 11 on the other side 122 of the assembly plate 12 corresponding to the two first inclined planes 3311a. In this embodiment, the first inner wall 111 correspondingly provided with the recessed portion 115a includes the second inclined plane 1111, and the third inner wall 113 correspondingly provided with the recessed portion 115a includes the second inclined plane 1131. When the cable organizer 30 is assembled to the case 10, the first inclined plane 3311a on the front end of the protruding portion 331a and the second inclined plane 1111 and 1131 can abut against each other, so that the insert 33 can be more smoothly moved toward the long axis C1, and the cable organizer 30 can be easily placed in the case 10.

It can be learned from FIG. 4 and FIG. 5 that the tubular body 31a has a profile that is symmetrically arranged when rotated around an axis C2 of the tubular body 31a by 180 degrees, which means that the profile of the tubular body 31a is symmetrical. An upper portion and a lower portion of the tubular body 31a being bounded by a horizontal plane formed through the axis C2 are approximately elliptical and symmetrical from left to right. That is to say, the profile of the tubular body 31a after the rotation about the axis C2 by 180 degrees is completely consistent. Therefore, the cable organizer may be assembled to either side of the case 10, and the same component may be used on different sides of the case 10, so that types of components required for manufacture can be reduced.

What is claimed is:

1. A connecting structure, comprising: a case, comprising a hollow shell and an assembly plate, wherein the assembly plate is accommodated in the hollow shell, and two through holes are formed between two opposite side edges of the assembly plate and an inner wall of the hollow shell; a rotating shaft, assembled to one side of the assembly plate; and a cable organizer, comprising a tubular body, a spacer, and two inserts, wherein the spacer is located at one end of the tubular body, the two inserts are located at two opposite sides of another end of the tubular body, and when the cable organizer is assembled to the case from another side of the assembly plate, the two inserts respectively penetrate through the two through holes and are engaged with and fixed to the inner wall of the hollow shell.

2. The connecting structure according to claim 1, wherein each of the two inserts comprises an embedding portion and a fixing portion, the embedding portion is connected between the tubular body and the fixing portion, the embedding portion abuts against the assembly plate, and the fixing portion penetrates through one of the through holes.

3. The connecting structure according to claim 1, wherein the two inserts each have a guide surface at an end of away from the tubular body and facing the assembly plate.

4. The connecting structure according to claim 1, wherein each of the inserts comprises a recessed portion, and the hollow shell comprises a protruding portion on the inner wall at a position corresponding to the recessed portion of the each insert.

5. The connecting structure according to claim 4, wherein each protruding portion comprises a first inclined surface on a side facing away from the assembly plate, and each of the inserts comprises a second inclined surface on an end away from the tubular body and facing the inner wall of the hollow shell.

6. The connecting structure according to claim 1, wherein each of the inserts comprises a protruding portion, and the hollow shell comprises a recessed portion on the inner wall at a position corresponding to the protruding portion of the each insert.

7. The connecting structure according to claim 6, wherein each protruding portion comprises a first inclined plane on a side facing away from the tubular body, and the hollow shell comprises two second inclined planes on an inner side wall corresponding to the two first inclined surfaces.

8. The connecting structure according to claim 1, wherein a side of the spacer is connected to the tubular body, and a spacing exists between another side of the spacer and the tubular body.

9. The connecting structure according to claim 1, wherein a profile of the tubular body is asymmetrical.

10. The connecting structure according to claim 1, wherein a profile of the tubular body is symmetrical.

\* \* \* \* \*